United States Patent
Li et al.

(10) Patent No.: US 10,397,771 B2
(45) Date of Patent: *Aug. 27, 2019

(54) TECHNIQUES FOR PROVISIONING BOOTSTRAP ELECTRONIC SUBSCRIBER IDENTITY MODULES (ESIMS) TO MOBILE DEVICES

(71) Applicant: Apple Inc., Cupertino, CA (US)

(72) Inventors: Li Li, Los Altos, CA (US); Clark P. Mueller, San Jose, CA (US); Avinash Narasimhan, Fremont, CA (US); Arun G. Mathias, Los Altos, CA (US); Najeeb M. Abdulrahiman, Fremont, CA (US); David T. Haggerty, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/244,035

(22) Filed: Jan. 9, 2019

(65) Prior Publication Data

US 2019/0166483 A1    May 30, 2019

Related U.S. Application Data

(63) Continuation of application No. 15/253,783, filed on Aug. 31, 2016, now Pat. No. 10,182,338.

(51) Int. Cl.
*H04W 8/18* (2009.01)
*H04L 29/06* (2006.01)
(Continued)

(52) U.S. Cl.
CPC .......... *H04W 8/183* (2013.01); *G06F 21/575* (2013.01); *G06F 21/72* (2013.01); *H04L 63/123* (2013.01);
(Continued)

(58) Field of Classification Search
CPC ....... H04W 8/183; H04W 4/50; H04W 12/10; H04W 8/245; G06F 21/72; G06F 21/575; H04L 63/123
See application file for complete search history.

(56) References Cited

U.S. PATENT DOCUMENTS

2012/0135710 A1    5/2012 Schell et al.
2013/0157673 A1    6/2013 Brusilovsky
(Continued)

*Primary Examiner* — Joseph E Dean, Jr.
(74) *Attorney, Agent, or Firm* — Dickinson Wright LLP

(57) ABSTRACT

Representative embodiments described herein set forth techniques for provisioning bootstrap electronic Subscriber Identity Modules (eSIMs) to mobile devices. According to some embodiments, a mobile device can be configured to issue, to an eSIM selection server, a bootstrap eSIM request that includes (i) metadata associated with the mobile device, and (ii) metadata associated with an electronic Universal Integrated Circuit Card (eUICC) included in the mobile device. In turn, the eSIM selection server selects and binds a particular bootstrap eSIM to the mobile device, and provides information to the mobile device that enables the mobile device to obtain the particular bootstrap eSIM from one or more eSIM servers. When the mobile device obtains the particular bootstrap eSIM, the mobile device can interface with a mobile network operator (MNO) and obtain a complete eSIM that enables the mobile device to access services provided by the MNO.

20 Claims, 8 Drawing Sheets

(51) Int. Cl.

| | |
|---|---|
| *G06F 21/72* | (2013.01) |
| *H04W 12/10* | (2009.01) |
| *H04W 4/50* | (2018.01) |
| *H04W 8/24* | (2009.01) |
| *H04W 4/60* | (2018.01) |
| *G06F 21/57* | (2013.01) |

(52) U.S. Cl.
CPC ............... *H04W 4/50* (2018.02); *H04W 4/60* (2018.02); *H04W 12/10* (2013.01); *H04W 8/245* (2013.01)

(56) References Cited

U.S. PATENT DOCUMENTS

| | | |
|---|---|---|
| 2014/0140507 A1 | 5/2014 | Park et al. |
| 2016/0007188 A1* | 1/2016 | Wane ...................... H04W 4/50 455/419 |
| 2016/0283216 A1 | 9/2016 | Gao |
| 2018/0063697 A1 | 3/2018 | Li et al. |

* cited by examiner

TECHNIQUES FOR PROVISIONING BOOTSTRAP ELECTRONIC SUBSCRIBER IDENTITY MODULES (ESIMS) TO MOBILE DEVICES

CROSS-REFERENCE TO RELATED APPLICATIONS

The present application is a continuation of U.S. application Ser. No. 15/253,783, entitled "TECHNIQUES FOR PROVISIONING BOOTSTRAP ELECTRONIC SUBSCRIBER IDENTITY MODULES (ESIMS) TO MOBILE DEVICES," filed Aug. 31, 2016, set to issue on Jan. 15, 2019 as U.S. Pat. No. 10,182,338, the content of which is incorporated herein by reference in its entirety for all purposes.

FIELD

The described embodiments set forth techniques for provisioning bootstrap electronic Subscriber Identity Modules (eSIMs) to mobile devices.

BACKGROUND

Many mobile devices are configured to utilize Universal Integrated Circuit Cards (UICCs) that enable the mobile devices to access services provided by Mobile Network Operators (MNOs). In particular, each UICC includes at least a microprocessor and a read-only memory (ROM), where the ROM is configured to store an MNO profile—also referred to herein as a Subscriber Identity Module (SIM)—that a mobile device can utilize to register and interact with an MNO. Typically, a UICC takes the form of a small removable card (commonly referred to as a SIM card) that is configured to be inserted into a UICC-receiving bay included in a mobile device. In more recent implementations, however, UICCs are being embedded directly into system boards of mobile devices. These electronic/embedded UICCs (eUICCs) can provide advantages over traditional SIM cards, e.g., an eUICC can store a number of MNO profiles—referred to herein as electronic Subscriber Identity Modules (eSIMs)—and can eliminate the need to include UICC-receiving bays in mobile devices.

Despite the various advantages provided by eUICCs, particular issues are arising that have yet to be addressed. For example, in traditional approaches, SIM vendors can purchase eUICCs from chip manufacturers and load sensitive information (e.g., bootstrap eSIMs for establishing preliminary connections to MNOs) onto the eUICCs prior to distribution. However, the ever-decreasing scale of eUICCs is imposing new limitations on the ability for the SIM vendors to load sensitive information onto the eUICCs. For example, wafer-level chip scale packaging (WLCSP)—a process that yields smaller chip sizes—can require sensitive information to be loaded onto the chips when they are manufactured. Consequently, SIM vendors are required to share sensitive information with the chip manufacturers, which is undesirable for a variety of reasons and introduces security issues. Consequently, there exists a need for a technique where current chip manufacturing techniques can be utilized without requiring sensitive information to be shared between SIM vendors and chip manufacturers.

SUMMARY

Representative embodiments described herein set forth techniques for provisioning bootstrap electronic Subscriber Identity Modules (eSIMs) to mobile devices.

One embodiment sets forth a method for obtaining and installing a bootstrap electronic Subscriber Identity Module (eSIM) at a mobile device. According to some embodiments, the method is carried out at the mobile device, and includes the steps of (1) generating a command to obtain the bootstrap eSIM, wherein the command includes first metadata associated with the mobile device, (2) issuing the command to an electronic Universal Integrated Circuit Card (eUICC) included in the mobile device, (3) receiving, from the eUICC and in response to the command, a bootstrap eSIM request, wherein the bootstrap eSIM request is based on (i) the first metadata associated with the mobile device, and (ii) second metadata associated with the eUICC, (4) providing the bootstrap eSIM request to a bootstrap eSIM selection server, (5) receiving, from the bootstrap eSIM selection server, a bootstrap eSIM package that includes information for obtaining the bootstrap eSIM, and (6) obtaining the bootstrap eSIM in accordance with the bootstrap eSIM package.

Another embodiment sets forth a method for generating a bootstrap eSIM request at an eUICC included in a mobile device. According to some embodiments, the method is carried out at the eUICC, and includes the steps of (1) receiving, from the mobile device, a command to obtain a bootstrap eSIM, wherein the command includes first metadata associated with the mobile device, (2) gathering second metadata associated with the eUICC, (3) generating the bootstrap eSIM request based on (i) the first metadata associated with the mobile device, and (ii) second metadata associated with the eUICC, (4) providing the bootstrap eSIM request to the mobile device, (5) receiving the bootstrap eSIM from the mobile device, and (6) installing the bootstrap eSIM on the eUICC.

Yet another embodiment sets forth a method for selecting a bootstrap eSIM for a mobile device. According to some embodiments, the method is carried out at a bootstrap eSIM selection server, and includes the steps of (1) receiving, from the mobile device, a bootstrap eSIM request that includes (i) first metadata associated with the mobile device, and (ii) second metadata associated with an eUICC included in the mobile device, (2) identifying, based on the first metadata and the second metadata, a particular bootstrap eSIM for the mobile device, (3) binding the particular bootstrap eSIM to the mobile device, (4) generating a bootstrap eSIM package that includes information for obtaining the particular bootstrap eSIM, and (5) providing the bootstrap eSIM package to the mobile device.

Additional embodiments include a non-transitory computer readable storage medium configured to store instructions that, when executed by a processor included in a computing device, cause the computing device to carry out any of the above-described methods. Additional embodiments include a computing device that includes a processor configured to cause the computing device to carry out any of the above-described methods.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
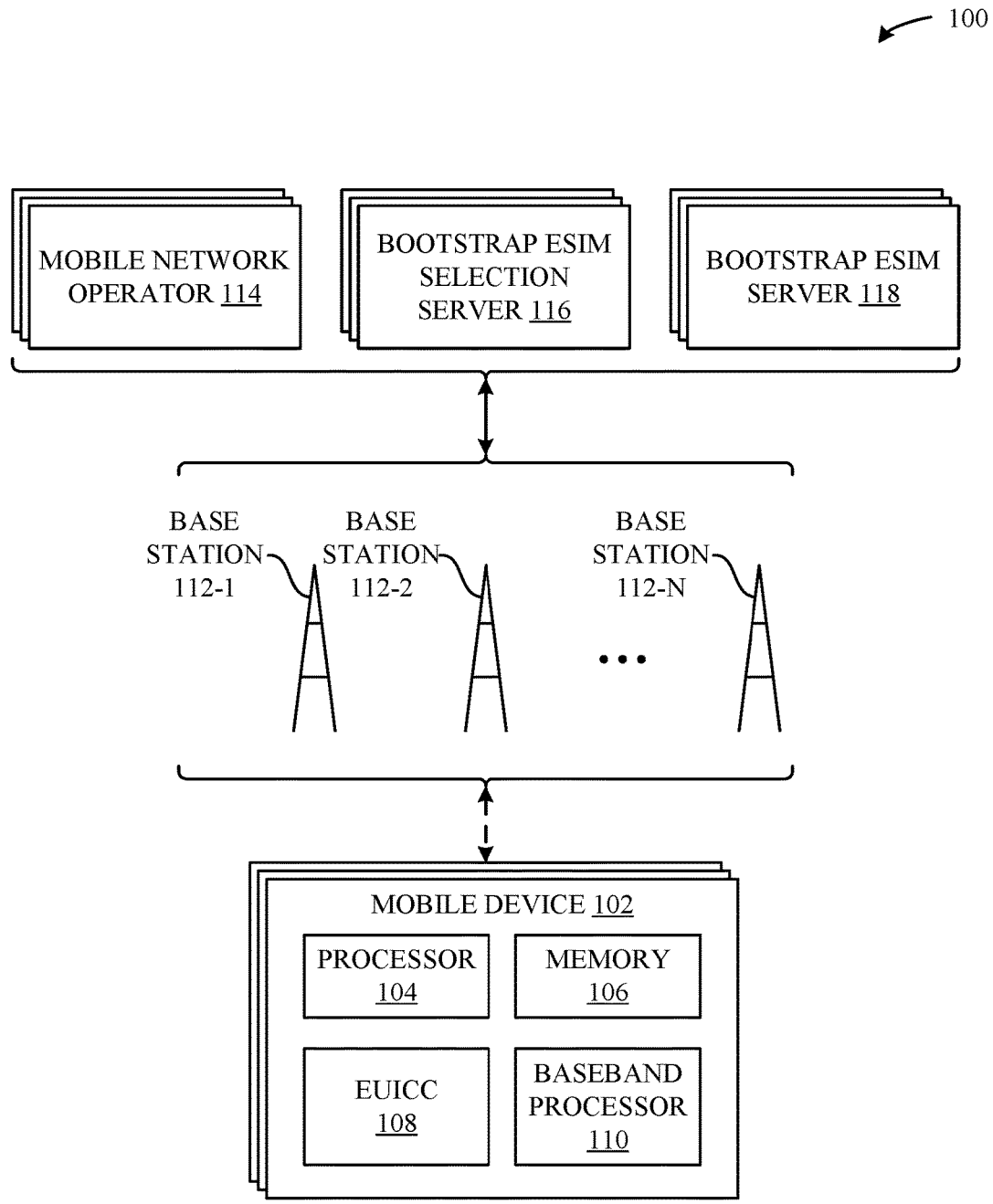
FIG. 1 illustrates a block diagram of different components of a system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative embodiments described herein set forth techniques for provisioning bootstrap electronic Subscriber Identity Modules (eSIMs) to mobile devices. In turn, the bootstrap eSIMs can be utilized by the mobile devices to interface with mobile network operators (MNOs) and obtain complete eSIMs that enable the mobile devices to access services provided by the MNOs.

A first technique disclosed herein is carried out at a mobile device and involves issuing a request for a bootstrap eSIM and installing the bootstrap eSIM upon receipt of the bootstrap eSIM. According to some embodiments, the mobile device can be configured to generate a command to obtain the bootstrap eSIM, where the command is directed to an electronic Universal Integrated Circuit Card (eUICC) included in the mobile device, and includes metadata associated with the mobile device (e.g., hardware information associated with the mobile device, location information associated with the mobile device, software version information associated with the mobile device, state information associated with the mobile device, information associated with a user of the mobile device (e.g., a selection of services/an MNO to which the user would like to subscribe), and/or the like). In turn, the eUICC generates a bootstrap eSIM request based on (i) the metadata associated with the mobile device, and (ii) metadata associated with the eUICC (e.g., a unique hardware identifier associated with the eUICC, software version information associated with the eUICC, information about eSIMs—if any—installed on the eUICC, state information associated with the eUICC (e.g., available storage space within the eUICC) and/or the like), and returns the bootstrap eSIM request to the mobile device. Next, the mobile device provides the bootstrap eSIM request to a bootstrap eSIM selection server. In response, the bootstrap eSIM selection server generates a bootstrap eSIM package in accordance with the bootstrap eSIM request. According to some embodiments, the bootstrap eSIM package includes information that enables the mobile device to obtain the bootstrap eSIM from a bootstrap eSIM server, or from another server/digital repository with which the bootstrap eSIM server is associated and with which the mobile device is capable of communicating. In turn, the mobile device obtains the bootstrap eSIM and provides the bootstrap eSIM to the eUICC for installation, whereupon the mobile device/eUICC can utilize the bootstrap eSIM to communicate with an MNO associated with the bootstrap eSIM. For example, the MNO can subsequently provide a complete eSIM to the eUICC to enable the mobile device to access services (e.g., voice and data) provided by the MNO.

A second technique disclosed herein is carried out at the eUICC in the mobile device and involves generating the bootstrap eSIM request. According to some embodiments, and as described above, the technique can involve receiving, from the mobile device, a command to obtain a bootstrap eSIM, where the command includes the metadata associated with the mobile device. In turn, the eUICC gathers the metadata associated with the eUICC, and generates the bootstrap eSIM request based on the combined metadata. In some embodiments, the eUICC can be associated with at least one public/private key pair, and the eUICC can utilize the private key to digitally sign the bootstrap eSIM request. As a brief aside, and as described below in greater detail, the bootstrap eSIM selection server can access the public key associated with the eUICC and can utilize the public key to verify the digital signature included in the bootstrap eSIM request. After the eUICC generates and digitally signs the bootstrap eSIM request, the eUICC provides the bootstrap eSIM request to the mobile device, whereupon the mobile device interacts with the bootstrap eSIM server to obtain the bootstrap eSIM (as described above). In turn, the eUICC receives the bootstrap eSIM from the mobile device and installs the bootstrap eSIM, whereupon the bootstrap eSIM can be used to communicate with the MNO and subsequently receive a complete eSIM (as described above).

A third technique disclosed herein is carried out at the eSIM selection server and involves selecting a bootstrap eSIM for the mobile device based on the bootstrap eSIM request. According to some embodiments, the technique can include receiving the bootstrap eSIM request from the mobile device, where the bootstrap eSIM request includes (i) the metadata associated with the mobile device, and (ii) the metadata associated with the eUICC included in the mobile device. In turn, the bootstrap eSIM selection server identifies, for the mobile device/eUICC, a particular bootstrap eSIM among a collection of bootstrap eSIMs that are accessible to the bootstrap eSIM selection server (e.g., either locally or remotely on other servers with which the bootstrap eSIM selection server is configured to interface). Next, the bootstrap eSIM selection server binds the particular bootstrap eSIM to the mobile device, which can involve marking the particular bootstrap eSIM as reserved for the mobile device. The bootstrap eSIM selection server then generates a bootstrap eSIM package that includes information for obtaining the particular bootstrap eSIM. The information can include, for example, identifiers associated with the particular bootstrap eSIM, addresses for one or more servers through which the particular bootstrap eSIM can be obtained (referred to herein as "discovery services"), and the like. Finally, the bootstrap eSIM selection server provides the bootstrap eSIM package to the mobile device, whereupon the mobile device processes the bootstrap eSIM package and obtains the particular bootstrap eSIM in accordance with the described techniques.

Accordingly, the techniques described herein provide a mechanism for provisioning bootstrap eSIMs to mobile devices. A more detailed discussion of these techniques is set forth below and described in conjunction with FIGS. 1-7, which illustrate detailed diagrams of systems and methods that can be used to implement these techniques.

FIG. 1 illustrates a block diagram of different components of a system 100 that is configured to implement the various techniques described herein, according to some embodiments. More specifically, FIG. 1 illustrates a high-level overview of the system 100, which, as shown, includes mobile devices 102 and a group of base stations 112 associated with one or more MNOs 114. According the illustration of FIG. 1, each mobile device 102 can represent a mobile computing device (e.g., an iPhone® by Apple®, an iPad® by Apple®, etc.), and the base stations 112 can represent different radio towers that are configured to enable the mobile devices 102 and MNOs 114 to communicate with one another. According to some embodiments, the MNOs 114 can represent different wireless service providers that provide specific services (e.g., voice and data) to which the mobile devices 102 can subscribe. As also shown in FIG. 1, the system 100 can also include bootstrap eSIM selection servers 116 that can implement services for selecting and preparing bootstrap eSIMs for delivery to the mobile devices 102. Moreover, the system 100 can include bootstrap eSIM servers 118 that can implement services for delivering the bootstrap eSIMs to the mobile devices 102.

As shown in FIG. 1, each mobile device 102 can include a processor 104, a memory 106, an eUICC 108, and a baseband processor 110. According to some embodiments, these components can work in conjunction to enable the mobile devices 102 to provide useful features to users, e.g., localized computing, location-based services, voice communications, Internet connectivity, and so on. According to some embodiments, the eUICC 108 can represent a removable Universal Integrated Circuit Card or an embedded/electronic Universal Integrated Circuit Card. As described in greater detail below, the eUICC 108 can be configured to store electronic Subscriber Identity Modules (eSIMs) for accessing the different MNOs 114 through the base stations 112. For example, the eUICC 108 of a mobile device 102 can be configured to store an eSIM for each MNO 114 to which the mobile device 102 is subscribed. Although not illustrated in FIG. 1, a mobile device 102 can also be configured to include a receiving bay for a removable UICC that manages one or more physical SIM cards.

Figure 2:
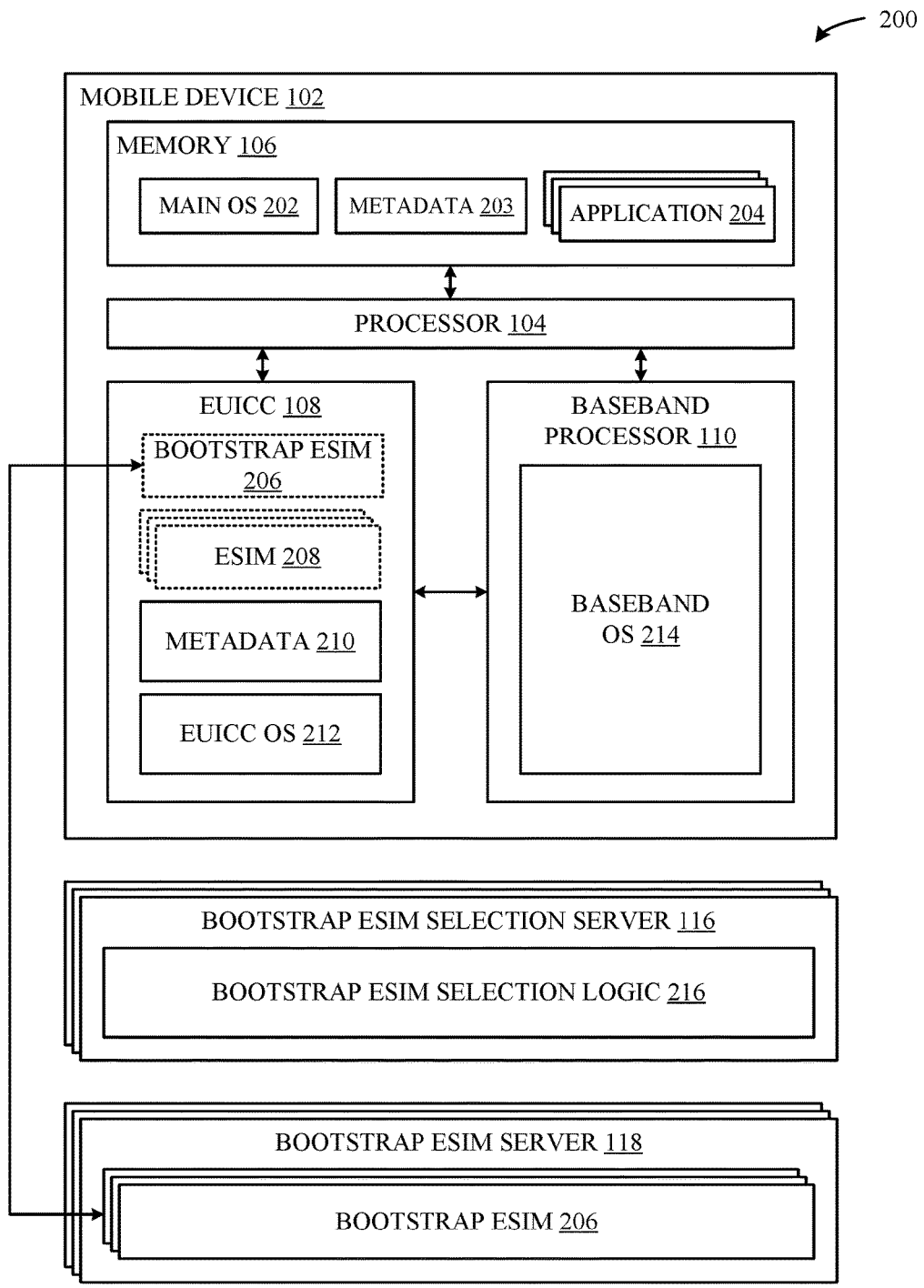
FIG. 2 illustrates a block diagram of a more detailed view of particular components of the system of FIG. 1, according to some embodiments.

FIG. 2 illustrates a block diagram of a more detailed view 200 of particular components of a mobile device 102 of FIG. 1, according to some embodiments. As shown in FIG. 2, the processor 104, in conjunction with the memory 106, can implement a main operating system (OS) 202 that is configured to execute applications 204 (e.g., native OS applications and user applications). As also shown in FIG. 2, the memory 106 can include metadata 203 that is accessible to the main OS 202. According to some embodiments, the metadata 203 can include various information associated with the mobile device 102, e.g., an International Mobile Equipment Identity (IMEI) number associated with the mobile device 102, a current geographical location of the mobile device 102, a device type of the mobile device 102, information input by a user of the mobile device 102, software version information associated with the mobile device 102, and the like. It is noted that these examples are not an exhaustive list of what the metadata 203 can include, and that the metadata 203 can include any form of information that can be utilized when selecting a bootstrap eSIM for the mobile device 102, as described in greater detail herein.

As shown in FIG. 2, the eUICC 108 can implement an eUICC OS 212 that is configured to manage the hardware resources of the eUICC 108 (e.g., a processor and a memory (not illustrated in FIG. 2)). According to some embodiments, the eUICC 108 can be configured to manage at least one bootstrap eSIM 206 that can be obtained via the bootstrap eSIM selection techniques described herein. The eUICC 108 can also be configured to manage a complete eSIM 208 that can be obtained, for example, via the bootstrap eSIM 206/MNO 114 associated with the bootstrap eSIM 206, as described in greater detail herein. According to some embodiments, the eUICC 108 can also be configured to manage metadata 210 associated with the eUICC 108. The metadata 210 can include, for example, a physical hardware identifier (ID) that is unique to the eUICC 108, information about eSIMs (both bootstrap eSIMs 206 and complete eSIMs 208) installed on the eUICC 108, software version information associated with the eUICC 108, and the like. It is noted that these examples are not an exhaustive list of what the metadata 210 can include, and that the metadata 210 can include any form of information that can be utilized when selecting a bootstrap eSIM 206 for the mobile device 102, as described in greater herein.

According to some embodiments, the eUICC OS 212 can be configured to activate the eSIMs within the eUICC 108 and provide the baseband processor 110 with access to the eSIMs. Although not illustrated in FIG. 2, each eSIM can be associated with a unique identifier (ID) and can include multiple applets that define the manner in which the eSIM operates. For example, one or more of the applets, when implemented by the baseband processor 110 and the eUICC 108, can be configured to enable the mobile device 102 to communicate with an MNO 114 and provide useful features to a user of the mobile device 102. For example, a bootstrap eSIM 206 can enable the mobile device 102 to establish an account with an MNO 114, whereupon the MNO 114 can provide a complete eSIM 208 to the mobile device 102. In turn, the mobile device 102 can utilize the complete eSIM 208 to access services provided by the MNO, e.g., voice and data services.

As also shown in FIG. 2, the baseband processor 110 of the mobile device 102 can include a baseband OS 214 that is configured to manage the hardware resources of the baseband processor 110 (e.g., a processor, a memory, different radio components, etc.). According to one embodiment, the baseband processor 110/baseband OS 214 can implement a manager (not illustrated in FIG. 2) that is configured to interface with the eUICC 108. The manager also can be configured to implement various services, e.g., a collection of software modules that are instantiated by way of the various applets of activated eSIMs that are managed by the eUICC 108. For example, the services can be configured to manage the different connections that exist between the mobile device 102 and the MNOs 114 according to the different eSIMs that are activated.

Further shown in FIG. 2 is a more detailed breakdown of the bootstrap eSIM selection server 116 and the bootstrap eSIM server 118. According to some embodiments, the bootstrap eSIM selection server 116 can be configured to implement bootstrap eSIM selection logic 216 that enables the bootstrap eSIM selection server 116 to receive and respond to bootstrap eSIM requests issued by mobile devices 102. A more detailed breakdown of the functionalities provided by the bootstrap eSIM selection logic 216 is provided below in conjunction with FIG. 5. Moreover, and as shown in FIG. 2, the bootstrap eSIM server 118 can store a collection of bootstrap eSIMs 206 and distribute the bootstrap eSIMs 206 to the mobile devices 102. According to some embodiments, the bootstrap eSIM server 118 can be also be configured to interface with other servers that manage digital repositories (not illustrated in FIG. 2) in which bootstrap eSIMs 206 are included and can be accessed by the mobile devices 102, which can help streamline the bootstrap eSIM 206 delivery process.

Figure 3A:
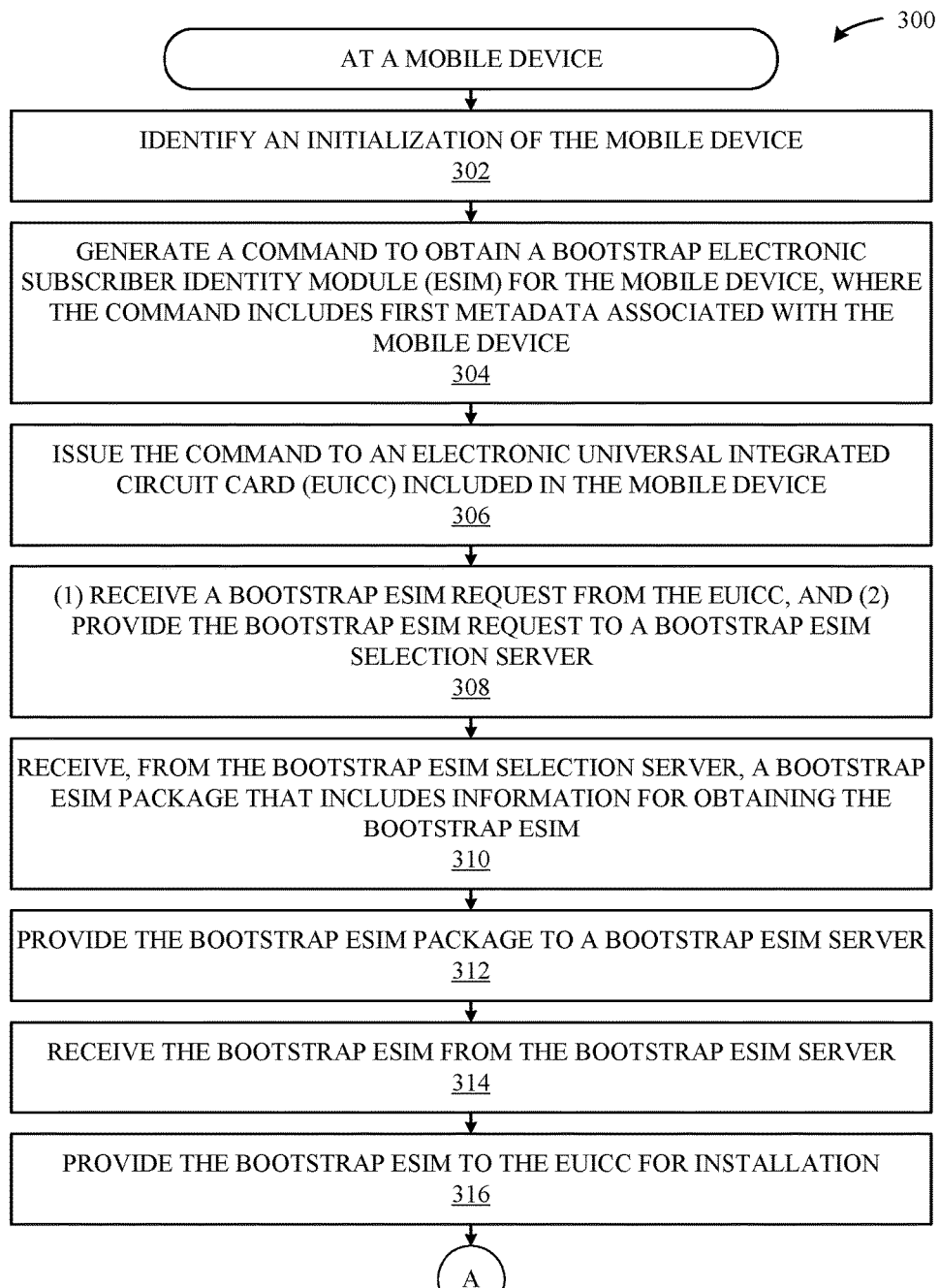
FIGS. 3A-3B illustrate a method for obtaining and installing a bootstrap eSIM at a mobile device, according to some embodiments.
Figure 3B:
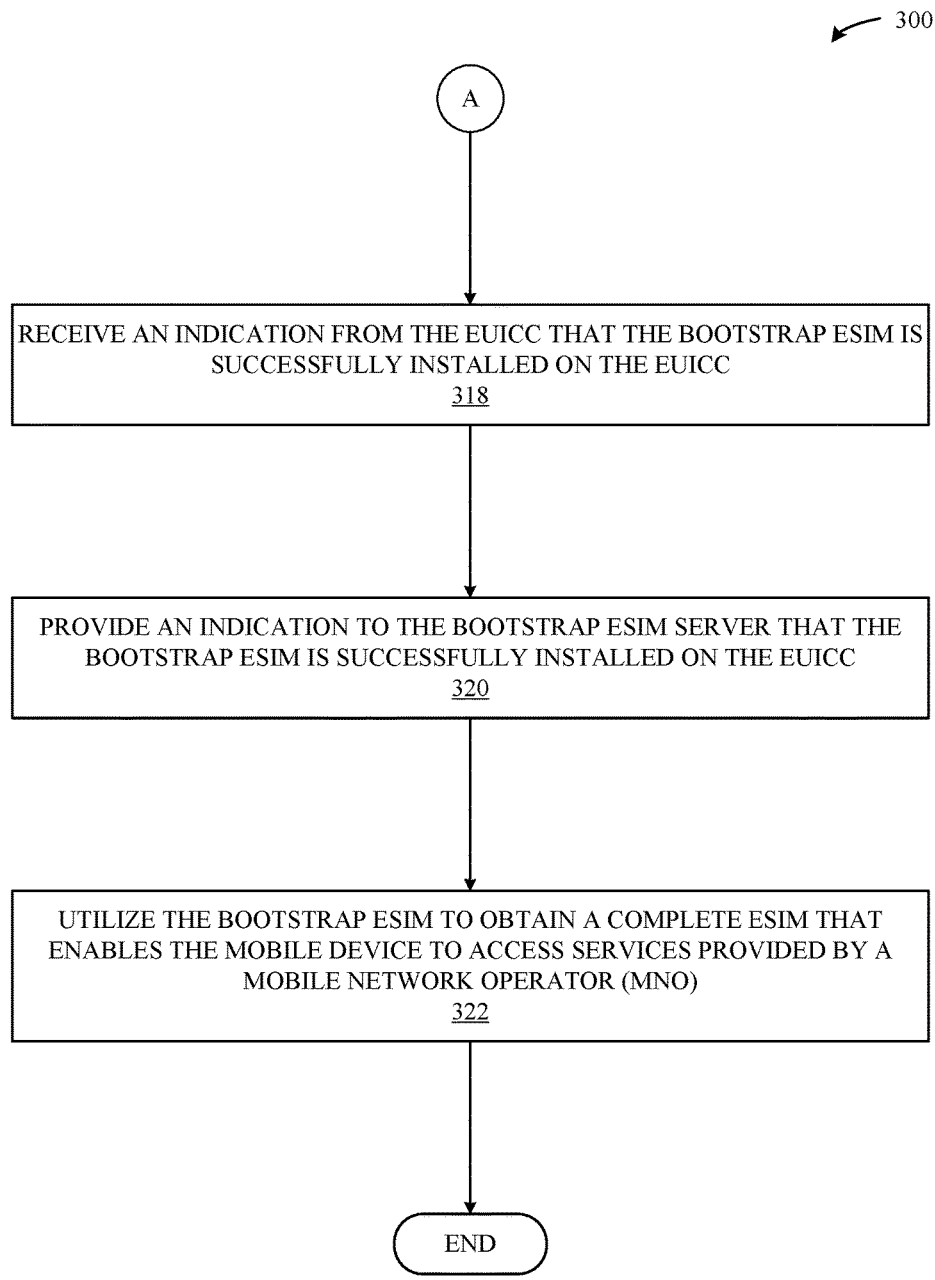

FIGS. 3A-3B illustrate a method 300 for obtaining and installing a bootstrap eSIM (e.g., the bootstrap eSIM 206) at a mobile device (e.g., the mobile device 102), according to some embodiments. As shown in FIG. 3A, the method 300 can be carried out by the main OS 202 executing on the mobile device 102. However, it is noted that it is not a requirement for the method 300 to be carried out by the main OS 202, and that one or more other programs executing on the mobile device 102 can be configured to carry out the method 300.

The method 300 begins at step 302, where the main OS 202 identifies an initialization of the mobile device 102. This can occur, for example, when a mobile device is powered-on by a user who is accessing the mobile device 102 for a first time, when the mobile device 102 undergoes a factory reset, and the like. At step 304, the main OS 202 generates a command to obtain the bootstrap eSIM 206 for the mobile device 102, where the command includes first metadata (e.g., the metadata 203) associated with the mobile device 102 (e.g., hardware information associated with the mobile device 102, location information associated with the mobile device 102, information associated with a user of the mobile device 102, software version information associated with the mobile device 102, and/or the like). At step 306, the main OS 202 issues the command to an eUICC (e.g., the eUICC 108) included in the mobile device 102.

At step 308, and in response to issuing the command to the eUICC 108 at step 306, the main OS 202 (1) receives a bootstrap eSIM request from the eUICC 108, and (2) provides the bootstrap eSIM request to a bootstrap eSIM selection server (e.g., the bootstrap eSIM selection server 116). It is noted that the mobile device 102 can communicate with the bootstrap eSIM selection server 116 through any electronic communications connection, e.g., the mobile device 102 can be connected to the Internet via a WiFi connection (e.g., using a WiFi component included in the mobile device 102), a wired connection (e.g., to another device with an Internet connection or a direct network connection), a cellular connection (e.g., by way of an existing SIM accessible to the mobile device 102), and so on.

At step 310, the main OS 202 receives, from the bootstrap eSIM selection server 116, a bootstrap eSIM package that includes information for obtaining the bootstrap eSIM 206. The information can include, for example, identifiers associated with the bootstrap eSIM 206, addresses for one or more servers (e.g., bootstrap eSIM servers 118) through which the bootstrap eSIM 206 can be obtained, authorization tokens for downloading the bootstrap eSIM 206 from the bootstrap eSIM servers 118, and the like. At step 312, the main OS 202 provides the bootstrap eSIM package to a bootstrap eSIM server 118. Alternatively, the main OS 202 can provide the bootstrap eSIM package to another server associated with the bootstrap eSIM server 118 (e.g., a digital repository). At step 314, the main OS 202 receives the bootstrap eSIM 206 from the bootstrap eSIM server 118/ digital repository.

At step 316, the main OS 202 provides the bootstrap eSIM 206 to the eUICC 108 for installation. Turning now to FIG. 3B, at step 318, the main OS 202 receives an indication from the eUICC 108 that the bootstrap eSIM 206 is successfully installed on the eUICC 108. At step 320, the main OS 202 provides, to the bootstrap eSIM server 118, the bootstrap eSIM selection server 116, and/or the digital repository, an indication that the bootstrap eSIM 206 is successfully installed on the eUICC 108. According to some embodiments, the bootstrap eSIM selection server 116, the bootstrap eSIM server 118, and the digital repository can be configured to directly interface with communicate the indication between one another. In this manner, the bootstrap eSIM selection server 116, the bootstrap eSIM server 118, and/or the digital repository can stay synchronized to ensure that the bootstrap eSIMs are properly managed.

At optional step 322, the main OS 202 can utilize the bootstrap eSIM 206 to communicate with an MNO 114 associated with the bootstrap eSIM 206 to obtain a complete eSIM (e.g., a complete eSIM 208) that enables the mobile device 102 to access services provided by the MNO 114. According to some embodiments, the mobile device 102 can also utilize the bootstrap eSIM 206 to perform other functions, e.g., the bootstrap eSIM 206 can be used to unlock/activate the mobile device 102, enable the mobile device 102 to access other services, and so on.

Figure 4:
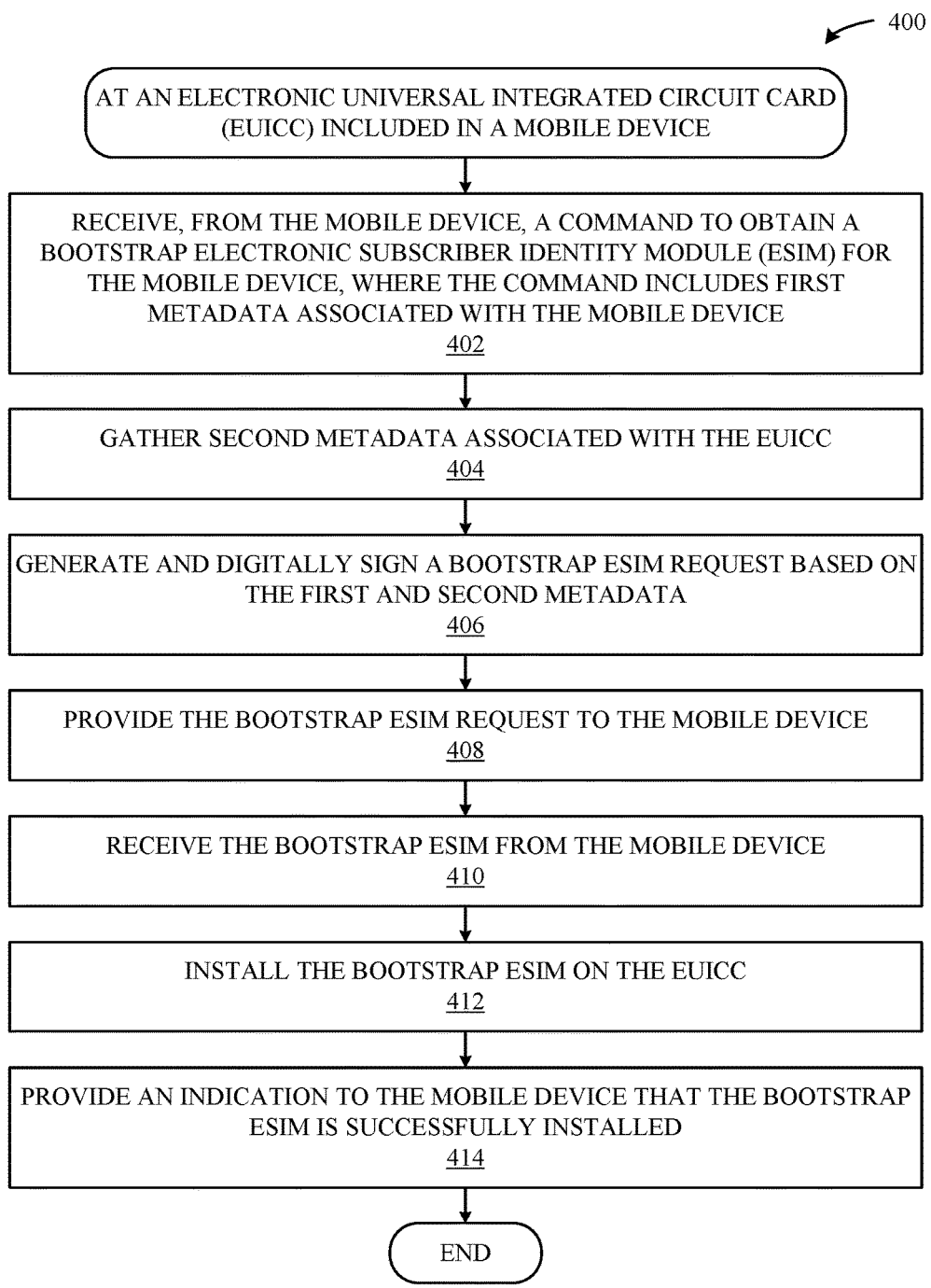
FIG. 4 illustrates a method for generating a bootstrap eSIM request at an eUICC included in a mobile device, according to some embodiments.

FIG. 4 illustrates a method 400 for generating a bootstrap eSIM request (e.g., for the bootstrap eSIM 206) at an eUICC (e.g., the eUICC 108) included in a mobile device (e.g., the mobile device 102), according to some embodiments. As shown in FIG. 4, the method 400 can be carried out by the eUICC OS 212 executing on the eUICC 108. However, it is noted that it is not a requirement for the method 400 to be carried out by the eUICC OS 212, and that one or more programs executing on the eUICC 108 can be configured to carry out the method 400.

The method 400 begins at step 402, where the eUICC OS 212 receives, from the mobile device 102, a command to obtain a bootstrap eSIM 206 for the mobile device 102, where the command includes first metadata (e.g., the metadata 203) associated with the mobile device 102. This command represents the command that is generated at step 306 of FIG. 3, described above in detail. At step 404, the eUICC OS 212 gathers second metadata (e.g., the metadata 210) associated with the eUICC 108 (e.g., a unique hardware identifier associated with the eUICC 108, software version information associated with the eUICC 108, information about eSIMs—if any—installed on the eUICC 108, state information associated with the eUICC 108, and/or the like).

At step 406, the eUICC OS 212 generates and digitally signs a bootstrap eSIM request based on the metadata 203 and the metadata 210. In some embodiments, the eUICC 108 can be associated with at least one public/private key pair, and the eUICC OS 212 can utilize the private key to digitally sign the bootstrap eSIM request. In turn, the bootstrap eSIM selection server 116 can access a public key associated with the eUICC 108 and can utilize the public key to verify the digital signature included in the bootstrap eSIM request, which is described below in greater detail in conjunction with FIG. 5. At step 408, the eUICC OS 212 provides the bootstrap eSIM request to the mobile device 102.

At step 410, the eUICC OS 212 receives the bootstrap eSIM 206 from the mobile device 102 (i.e., after the mobile device 102 receives the bootstrap eSIM 206 from a bootstrap eSIM server 118/digital repository). At step 412, the eUICC OS 212 installs the bootstrap eSIM 206 on the eUICC 108. At step 414, the eUICC OS 212 provides an indication to the mobile device 102 that the bootstrap eSIM 206 is successfully installed.

Figure 5:
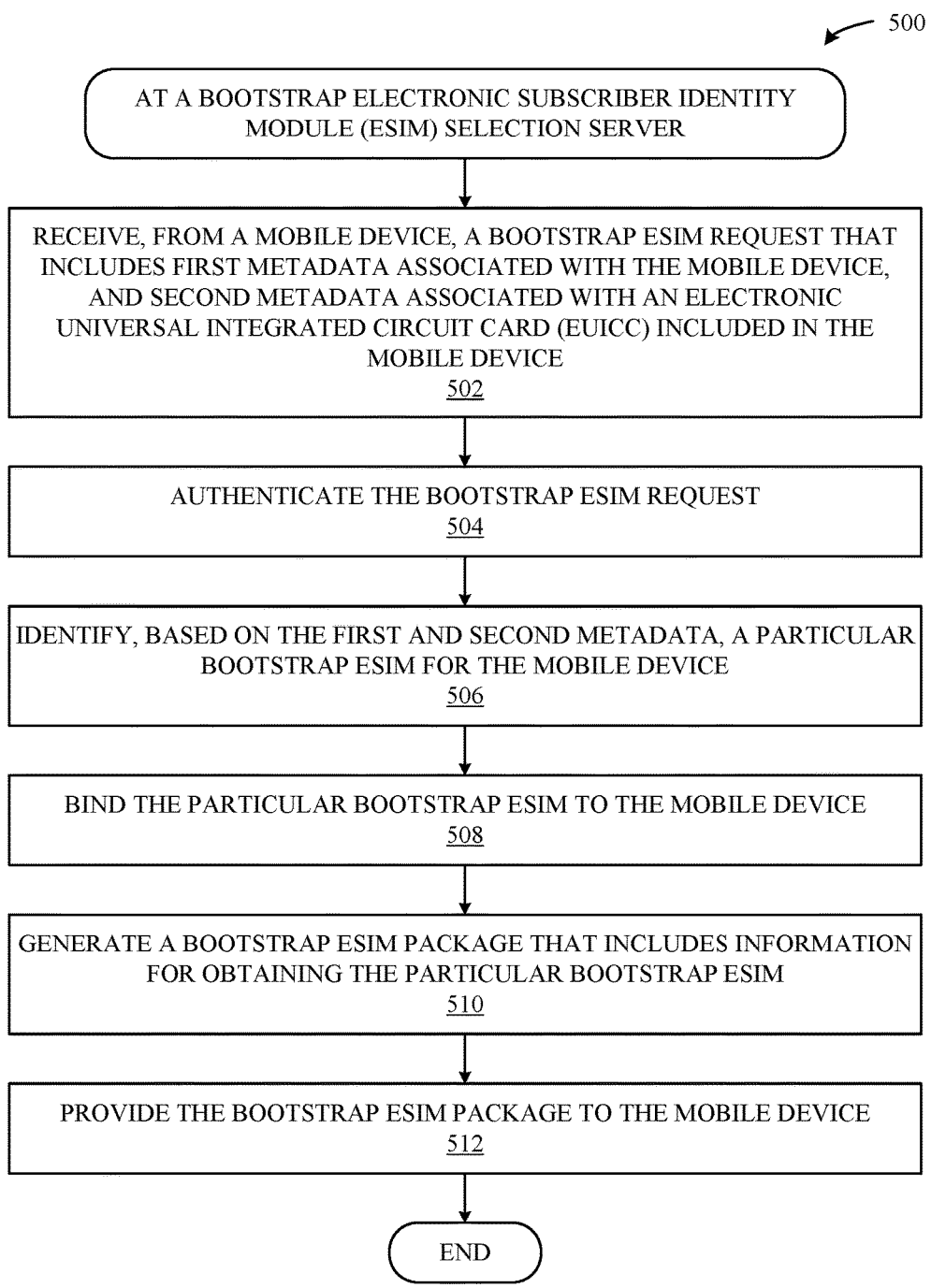
FIG. 5 illustrates a method for selecting a bootstrap eSIM for a mobile device at a bootstrap eSIM selection server, according to some embodiments.

FIG. 5 illustrates a method 500 for selecting a bootstrap eSIM (e.g., the bootstrap eSIM 206) for a mobile device (e.g., the mobile device 102) at a bootstrap eSIM selection server (e.g., the bootstrap eSIM selection server 116), according to some embodiments. As shown in FIG. 5, the method 500 can be carried out by the bootstrap eSIM selection server 116 (e.g., by bootstrap eSIM selection logic 216).

The method 500 begins at step 502, where the bootstrap eSIM selection server 116 receives, from the mobile device 102, a bootstrap eSIM request that includes first metadata (e.g., the metadata 203) associated with the mobile device 102, and second metadata (e.g., the metadata 210) associated with an eUICC (e.g., the eUICC 108) included in the mobile device 102. At step 504, the bootstrap eSIM selection server 116 authenticates the bootstrap eSIM request. According to some embodiments, step 504 can include verifying a digital signature included in the bootstrap eSIM request. For example, the bootstrap eSIM selection server 116 can be configured to obtain, based on the metadata 203 and/or the metadata 210, a public key associated with the eUICC 108 that is accessible to the bootstrap eSIM selection server 116. In turn, the bootstrap eSIM selection server 116 can utilize the public key to verify that the digital signature aligns with the public key, which proves—at least to a reliable degree—that the mobile device 102/the eUICC 108 are authentic and recognizable to the bootstrap eSIM selection server 116. Other authentication techniques can be utilized, e.g., nonce verifications, encryption of the bootstrap eSIM request itself/components included in the bootstrap eSIM request, other digital signatures, and the like.

At step 506, the bootstrap eSIM selection server 116 identifies, based on the metadata 203 and the metadata 210, a particular bootstrap eSIM 206 for the mobile device 102. According to some embodiments, step 506 can involve implementing a variety of techniques for identifying the particular bootstrap eSIM 206 for the mobile device 102. For example, the bootstrap eSIM selection server 116 can be configured to select the particular bootstrap eSIM 206 based on business requirements associated with the metadata 203/metadata 210. Alternatively, the particular bootstrap eSIM 206 can be pre-assigned to the mobile device 102/eUICC 108 at a time of manufacture/subsequent to manufacture, e.g., based on known distribution channels. In this approach, the bootstrap eSIM selection server 116 can reference the information in the metadata 203/metadata 210 to identify the particular bootstrap eSIM 206 that is pre-assigned to the mobile device 102/eUICC 108. Although not illustrated in FIG. 2, the bootstrap eSIM selection server 116 can identify conditions in which a bootstrap eSIM 206 should not be assigned to the mobile device 102 and deny the request, thereby causing the method 500 to terminate. This can occur, for example, when an existing bootstrap eSIM 206 is installed at the mobile device 102 and it is not appropriate to provide a new bootstrap eSIM 206 to the mobile device 102.

At step 508, the bootstrap eSIM selection server 116 binds the particular bootstrap eSIM 206 to the mobile device 102. This can involve, for example, updating a database configuration that indicates the mobile device 102 to which the particular bootstrap eSIM 206 is assigned, marking the particular bootstrap eSIM 206 as reserved, and so on. This can also involve communicating with one or more bootstrap eSIM servers 118/digital repositories when applicable (e.g., when the particular bootstrap eSIM 206 is to be delivered to the mobile device 102 by way of the one or more bootstrap eSIM servers 118/digital repositories).

At step 510, the bootstrap eSIM selection server 116 generates a bootstrap eSIM package that includes information for obtaining the particular bootstrap eSIM 206. The information can include, for example, identifiers associated with the particular bootstrap eSIM 206, addresses for the one or more bootstrap eSIM servers 118/digital repositories through which the particular bootstrap eSIM 206 can be obtained, and the like. Finally, at step 512, the bootstrap eSIM selection server 116 provides the bootstrap eSIM package to the mobile device 102, whereupon the mobile device 102 can utilize the bootstrap eSIM package to download the particular bootstrap eSIM 206 from the one or more bootstrap eSIM servers 118/digital repositories.

It is noted that various communication flows can be implemented between the mobile device 102, the bootstrap eSIM selection servers 116, and the bootstrap eSIM servers 118. For example, the bootstrap eSIM selection server 116 can, in conjunction with providing the bootstrap eSIM package to the mobile device 102, be configured to interface with push notification servers so that push notifications are provided to the mobile device 102. This can help reduce the number of status requests that are issued and increase overall efficiency. For example, a push notification can be issued to the mobile device 102 when the particular bootstrap eSIM 206 is ready to be downloaded from the bootstrap eSIM servers 118/digital repositories. For example, the bootstrap eSIM selection server 116 can initially provide the bootstrap eSIM package to the mobile device 102 while monitoring/waiting for an update from the bootstrap eSIM server 118 that indicates the particular bootstrap eSIM 206 is ready to be downloaded. In turn, the bootstrap eSIM selection server 116 can cause the push notification to be issued to the mobile device 102, whereupon the mobile device 102 utilizes the bootstrap eSIM package to interface with the bootstrap eSIM servers 118/digital repositories and download the particular bootstrap eSIM 206. Additionally, and according to some embodiments, the bootstrap eSIM selection server 116 can be configured to determine whether the bootstrap eSIM package is successfully delivered to the mobile device 102, and take action as appropriate. For example, if the transmission of the particular bootstrap eSIM 206 is interrupted, the bootstrap eSIM selection server 116 can be configured to establish a push notification that will be delivered to the mobile device 102 the next time the mobile device 102 comes online.

It is noted that the foregoing examples do not represent an exhaustive list of the potential interactions between the mobile devices 102, the bootstrap eSIM selection servers 116, and the bootstrap eSIM servers 118, and that these entities can be configured to communicate according to any flow/order when implementing the techniques described herein.

Figure 6:
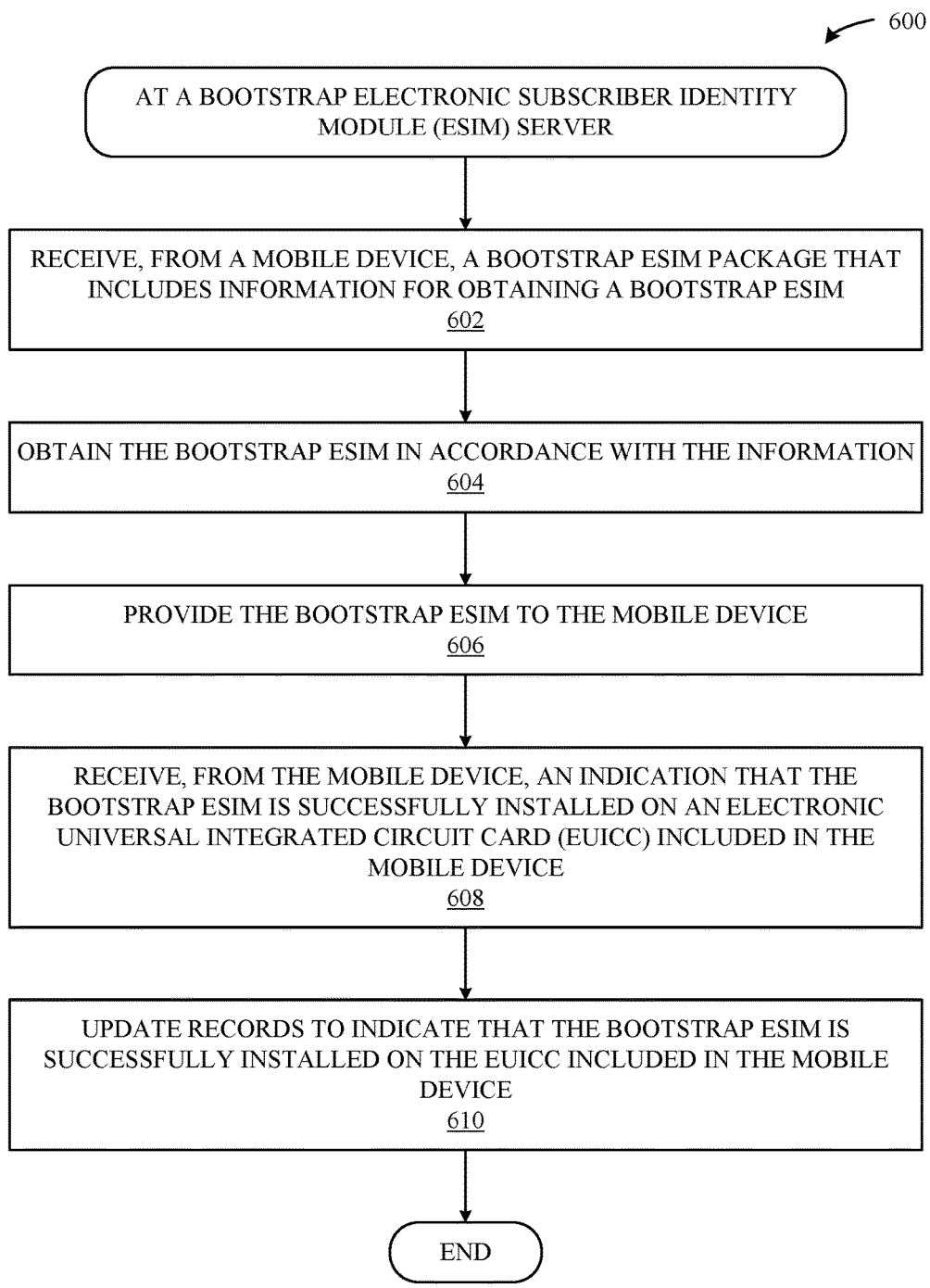
FIG. 6 illustrates a method for providing a bootstrap eSIM to a mobile device from a bootstrap eSIM server, according to some embodiments.

FIG. 6 illustrates a method 600 for providing a bootstrap eSIM (e.g., the bootstrap eSIM 206) to a mobile device (e.g., the mobile device 102) from a bootstrap eSIM server (e.g., the bootstrap eSIM server 118), according to some embodiments. As shown in FIG. 6, the method 600 can be carried out by the bootstrap eSIM server 118 (e.g., an OS executing on the bootstrap eSIM server 118). It is noted that the method 600 described in conjunction with FIG. 6 can also be carried out by other servers that implement digital repositories that are configured to store/deliver bootstrap eSIMs 206 to mobile devices 102 under the direction of the bootstrap eSIM selection server 116 and the bootstrap eSIM server 118.

The method 600 begins at step 602, where the bootstrap eSIM server 118 receives, from the mobile device 102, a bootstrap eSIM package that includes information for obtaining a bootstrap eSIM (e.g., the bootstrap eSIM 206). At step 604, the bootstrap eSIM server 118 obtains the bootstrap eSIM 206 in accordance with the information included in the bootstrap eSIM package. Step 604 can involve obtaining the bootstrap eSIM 206 from a memory that is accessible to the bootstrap eSIM server 118, e.g., a local memory, a remote memory, other servers that implement digital repositories, and the like. At step 606, the bootstrap eSIM server 118 provides the bootstrap eSIM 206 to the mobile device 102.

At step 608, the bootstrap eSIM server 118 receives, from the mobile device 102, an indication that the bootstrap eSIM 206 is successfully installed on an eUICC (e.g., the eUICC 108) included in the mobile device 102. At step 610, the bootstrap eSIM server 118 updates records to indicate that the bootstrap eSIM 206 is successfully installed on the eUICC 108 included in the mobile device 102. As previously noted herein, the bootstrap eSIM server 118 can be configured to communicate similar information to the bootstrap eSIM selection server 116/digital repositories so that the entities can stay synchronized and properly manage the bootstrap eSIMs 206 for which they are responsible.

It is noted that additional steps can be implemented that are not explicitly illustrated in FIGS. 3A-3B, 4, 5, and 6. According to some embodiments, when an existing bootstrap eSIM 206 is installed on/available to the mobile device 102, and the mobile device 102 receives a new bootstrap eSIM 206, the mobile device 102 can be configured to remove (i.e., delete or render inoperable) the existing bootstrap eSIM 206, return the bootstrap eSIM 206 (e.g., to a bootstrap eSIM selection server 116/bootstrap eSIM server 118), and the like. According to some embodiments, the mobile device 102 can be configured to install the new bootstrap eSIM 206 and remove/render inoperable the existing bootstrap eSIM 206 in an atomic manner such that both conditions need to be satisfied in order for the operation to be executed. Alternatively, the mobile device 102 can be configured to retain the existing bootstrap eSIM 206 and update a configuration such that 1) the new bootstrap eSIM 206 is the preferred bootstrap eSIM 206 (e.g., when the mobile device 102 powers-on), and 2) the existing bootstrap eSIM 206 is a backup/outdated bootstrap eSIM 206. It is noted that any communication flow can be utilized to implement these techniques, e.g., the mobile device 102 can act in accordance with its own configuration, and/or receive commands from the bootstrap eSIM selection servers 116/bootstrap eSIM servers 118 and perform these actions in response.

Figure 7:
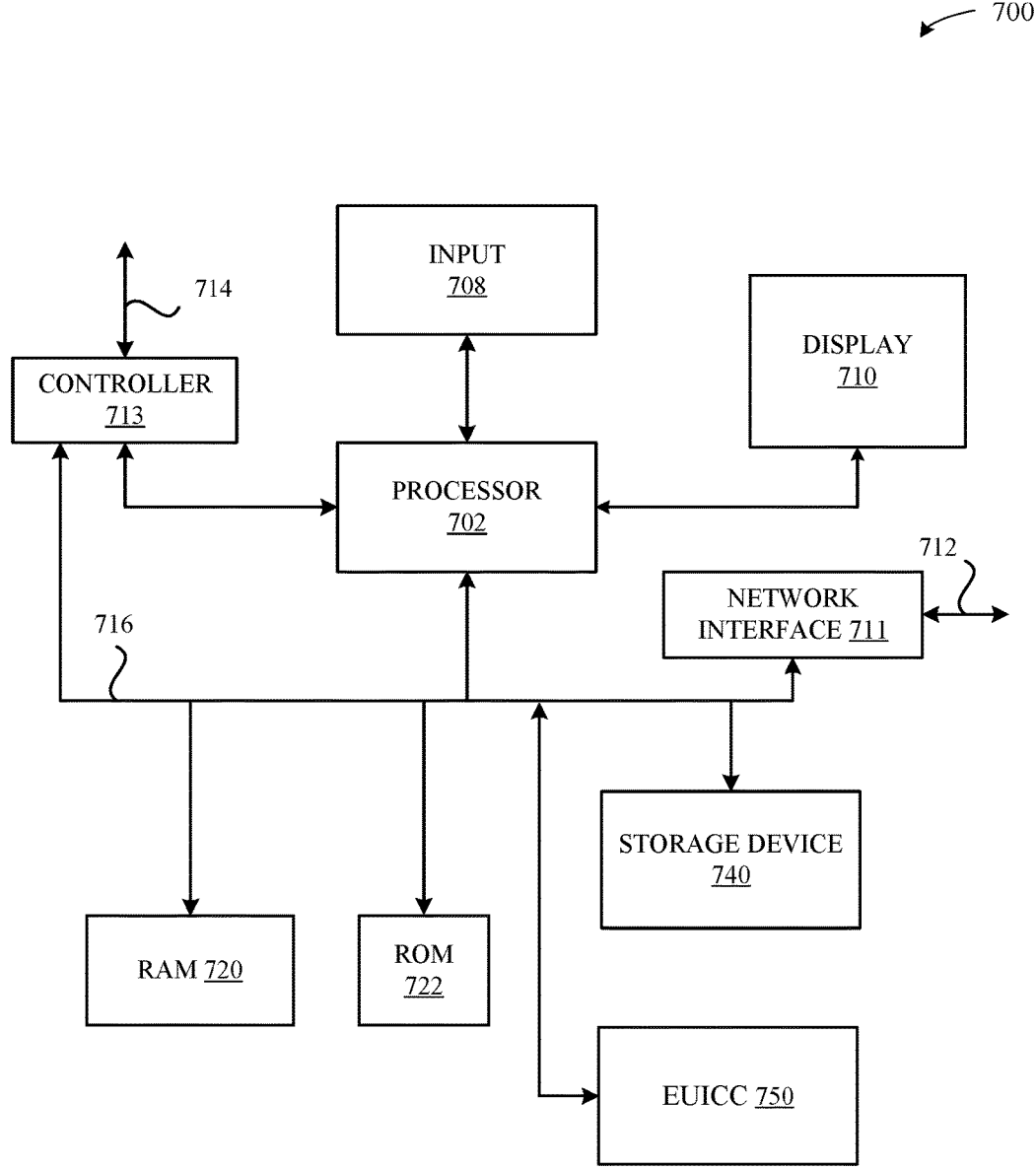
FIG. 7 illustrates a detailed view of a computing device that can be used to implement the various components described herein, according to some embodiments.

FIG. 7 illustrates a detailed view of a computing device 700 that can be used to implement the various components described herein, according to some embodiments. In particular, the detailed view illustrates various components that can be included in the mobile devices 102, the eSIM selection servers 116, the eSIM servers 118, the digital repositories described herein, and the like. As shown in FIG.

7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also include a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700. The computing device 700 can further include an eUICC 750, which can represent the eUICC 108 illustrated in FIGS. 1-2 and described in detail herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A mobile device configured to obtain and install a bootstrap electronic Subscriber Identity Module (eSIM), the mobile device comprising:
   an electronic Universal Integrated Circuit Card (eUICC); and
   at least one processor configured to cause the mobile device to:
      generate a command to obtain the bootstrap eSIM, wherein the command includes first metadata that identifies one or more operational aspects associated with the mobile device;
      issue the command to the eUICC;
      receive, from the eUICC and in response to the command, a bootstrap eSIM request, wherein the bootstrap eSIM request is based on (i) the first metadata, and (ii) second metadata that identifies one or more operational aspects associated with the eUICC;
      provide the bootstrap eSIM request to a bootstrap eSIM selection server;
      receive, from the bootstrap eSIM selection server, a bootstrap eSIM package that includes information for obtaining the bootstrap eSIM; and
      obtain the bootstrap eSIM in accordance with the bootstrap eSIM package, wherein the bootstrap eSIM is formed in accordance with the first and second metadata.

2. The mobile device of claim 1, wherein an existing bootstrap eSIM is installed on the eUICC, and the at least one processor further causes the mobile device to:
   remove or render inoperable the existing bootstrap eSIM, or
   return the existing bootstrap eSIM to the bootstrap eSIM selection server and/or a different bootstrap eSIM selection server.

3. The mobile device of claim 1, wherein the bootstrap eSIM request is digitally signed by the eUICC.

4. The mobile device of claim 1, wherein:
   the bootstrap eSIM package is provided to a bootstrap eSIM server, and
   the bootstrap eSIM is obtained from the bootstrap eSIM server.

5. The mobile device of claim 1, wherein the at least one processor further causes the mobile device to:
   provide the bootstrap eSIM to the eUICC for installation.

6. The mobile device of claim 5, wherein the at least one processor further causes the mobile device to, subsequent to providing the bootstrap eSIM to the eUICC for installation:
   receive a response from the eUICC that indicates the bootstrap eSIM is successfully installed on the eUICC.

7. The mobile device of claim 6, wherein the at least one processor further causes the mobile device to:
   provide, to the bootstrap eSIM selection server, an indication that the bootstrap eSIM is successfully installed on the eUICC.

8. The mobile device of claim 1, wherein the mobile device utilizes the bootstrap eSIM to communicate with a mobile network operator (MNO) associated with the bootstrap eSIM.

9. The mobile device of claim 8, wherein the at least one processor further causes the mobile device to:
   receive, from the MNO, a complete eSIM that enables the mobile device to access wireless services provided by the MNO.

10. An electronic Universal Integrated Circuit Card (eUICC) configured to generate and issue a bootstrap electronic Subscriber Identity Module (eSIM) request to a mobile device in which the eUICC is included, the eUICC comprising:
  at least one processor configured to cause the eUICC to:
    receive, from the mobile device, a command to obtain a bootstrap eSIM, wherein the command includes first metadata that identifies one or more operational aspects associated with the mobile device;
    gather second metadata associated with the eUICC;
    generate the bootstrap eSIM request based on (i) the first metadata associated with the mobile device, and (ii) second metadata that identifies one or more operational aspects associated with the eUICC;
    provide the bootstrap eSIM request to the mobile device;
    receive the bootstrap eSIM from the mobile device, wherein the bootstrap eSIM is formed in accordance with the first and second metadata; and
    install the bootstrap eSIM on the eUICC.

11. The eUICC of claim 10, wherein the at least one processor further causes the eUICC to, subsequent to installing the bootstrap eSIM:
  provide an indication to the mobile device that the bootstrap eSIM is successfully installed on the eUICC.

12. The eUICC of claim 10, wherein the at least one processor further causes the eUICC to, prior to providing the bootstrap eSIM request to the mobile device:
  digitally sign the bootstrap eSIM request.

13. The eUICC of claim 10, wherein the one or more operational aspects associated with the mobile device that are identified by the first metadata include one or more of:
  an International Mobile Equipment Identity (IMEI) number associated with the mobile device,
  a current geographical location of the mobile device,
  state information associated with the mobile device,
  software version information associated with the mobile device,
  a device type of the mobile device, or
  information input by a user of the mobile device.

14. The eUICC of claim 10, wherein the one or more operational aspects associated with the eUICC that are identified by the second metadata include one or more of:
  a physical hardware identifier (ID) that is unique to the eUICC,
  eSIMs managed by the eUICC,
  software version information associated with the eUICC, or
  state information associated with the eUICC.

15. A bootstrap electronic Subscriber Identity Module (eSIM) selection server configured to select a bootstrap eSIM for a mobile device, the bootstrap eSIM selection server comprising:
  at least one processor configured to cause the bootstrap eSIM selection server to:
    receive, from the mobile device, a bootstrap eSIM request that includes (i) first metadata that identifies one or more operational aspects associated with the mobile device, and (ii) second metadata that identifies one or more operational aspects associated with an electronic Universal Integrated Circuit Card (eUICC) included in the mobile device;
    identify, based on the first metadata and the second metadata, a particular bootstrap eSIM for the mobile device;
    bind the particular bootstrap eSIM to the mobile device in accordance with the first and second metadata;
    generate a bootstrap eSIM package that includes information for obtaining the particular bootstrap eSIM; and
    provide the bootstrap eSIM package to the mobile device.

16. The bootstrap eSIM selection server of claim 15, wherein the at least one processor further causes the bootstrap eSIM selection server to, upon receiving the bootstrap eSIM request:
  verify a digital signature included in the bootstrap eSIM request.

17. The bootstrap eSIM selection server of claim 16, wherein verifying the digital signature included in the bootstrap eSIM request comprises:
  obtaining, based on the second metadata, a public key associated with the eUICC; and
  utilizing the public key to verify that the digital signature included in the bootstrap eSIM request aligns with the public key.

18. The bootstrap eSIM selection server of claim 16, wherein binding the particular bootstrap eSIM to the mobile device comprises:
  interfacing with an eSIM server to select the particular bootstrap eSIM; and
  causing the eSIM server to reserve the particular bootstrap eSIM for the mobile device.

19. The bootstrap eSIM selection server of claim 18, wherein:
  the eSIM server stores the particular bootstrap eSIM, and
  the information included in the bootstrap eSIM package references the eSIM server.

20. The bootstrap eSIM selection server of claim 18, wherein:
  the particular bootstrap eSIM is stored in a digital repository managed by a different server in communication with the eSIM server, and
  the information included in the bootstrap eSIM package references the digital repository managed by the different server.

* * * * *